US007975618B2

(12) United States Patent
    Bullis

(10) Patent No.: US 7,975,618 B2
(45) Date of Patent: Jul. 12, 2011

(54) HYBRID WHEEL AND HYBRID ROADWAY

(76) Inventor: James Kenneth Bullis, Sunnyvale, CA (US)

(*) Notice: Subject to any disclaimer, the term of this patent is extended or adjusted under 35 U.S.C. 154(b) by 308 days.

(21) Appl. No.: 12/454,745

(22) Filed: May 21, 2009

(65) Prior Publication Data

US 2010/0294848 A1    Nov. 25, 2010

(51) Int. Cl.
    *B61C 11/00* (2006.01)
(52) U.S. Cl. .............. 105/72.2; 105/215.1; 105/215.2; 238/3
(58) Field of Classification Search ............. 105/72.2, 105/215.1, 215.2; 238/3; 104/30, 31, 32, 104/32.1, 35, 48, 262, 273
    See application file for complete search history.

(56) References Cited

U.S. PATENT DOCUMENTS

| | | | |
|---|---|---|---|
| 2,541,514 A * | 2/1951 | Herold ........................ 295/8.5 |
| 4,566,391 A * | 1/1986 | Haberl et al. ............ 105/215.1 |
| 5,289,778 A * | 3/1994 | Romine .................... 104/88.04 |
| 6,324,994 B1 * | 12/2001 | Glenn ........................ 105/72.2 |
| 6,352,035 B1 * | 3/2002 | Kashiwase et al. ......... 105/72.2 |
| 7,077,065 B2 * | 7/2006 | Tremblay et al. ............ 105/72.2 |
| 7,789,020 B2 * | 9/2010 | Li ............................ 104/130.01 |
| 2001/0050026 A1 * | 12/2001 | Esposito et al. ........... 105/215.2 |
| 2004/0250724 A1 * | 12/2004 | Sobolewski .............. 105/215.1 |
| 2007/0089637 A1 * | 4/2007 | Sproat ....................... 105/72.2 |
| 2010/0294848 A1 * | 11/2010 | Bullis ............................ 238/3 |

* cited by examiner

*Primary Examiner* — Joe Morano, IV
*Assistant Examiner* — Jason C Smith

(57) ABSTRACT

The invention is a hybrid wheel apparatus with a hybrid roadway apparatus that greatly reduces the energy lost due to rolling resistance where operation is on the hybrid roadway, but the system is configured to allow operation on conventional roads as needed.

The hybrid wheel system is a steel wheel used in combination with a rubber tired wheel. The hybrid roadway is a low profile steel rail fixed to the otherwise conventional road surface, which is preferably concrete but could also be the very common asphalt composition.

Where roadways are appropriately equipped with rails, the rail top surface is elevated over the roadway surface, and dimensions are set so that most of load force is carried on the steel wheel for general forward travel. Where the rail is absent the load is carried on the rubber tire, and the steel wheel is elevated above the roadway surface such that contact between the steel wheel and the roadway is prevented.

32 Claims, 13 Drawing Sheets

HYBRID WHEEL AND HYBRID ROADWAY

This patent document contains material that is subject to copyright protection. Facsimile reproduction is allowed of the patent document or the patent disclosure as it appears in the Patent and Trademark Office patent file or records as allowed by US patent law, but otherwise all copyright rights are reserved.

BACKGROUND OF THE INVENTION

1. Field of the Invention

This present invention relates to motor vehicles.

2. Description of the Prior Art

Steel wheels running on steel tracks roll with very little friction to make railroad trains very efficient. Such trains work well for point to point operation between terminals connected by the tracks. However, the steel wheels would work badly on most other road surfaces where abrasive effects would damage the steel wheels, and the hardness of the steel wheels would damage most road surfaces. Rubber tired wheels work well on most road surfaces, but cause significant rolling resistance due to friction.

Being limited to operation on tracks, trains are inefficient in providing door to door service. Our extensive network of roads means that rubber tired vehicles can be very effective in the kind of distributed delivery operations that are usually needed. This is true whether the loads are passengers or freight. Road vehicles can often provide door to door service, or if not, the number of transfers in the course of a journey can be significantly less. Thus road vehicles offer significant advantages over railroad vehicles.

There is a separate congestion problem that arises from having a large number of rode vehicles on the roads, extensive though the network of such roads might be. The well known benefits of mass transit systems are often promoted as a solution. The inescapable fact is however, that even with serious congestion, when time is at stake the transportation choice usually turns out to be in favor of the road vehicle. This is readily supported by observation, where a steady flow of trucks can very often be seen operating on roads that are generally parallel to railroad tracks. Given this reality, it seems reasonable to explore ways to make the more flexible transportation options more workable, whether these be cars to take people door to door or trucks to take freight door to door, or at least for freight to minimize the connections involved in the journey.

Even if aerodynamic drag forces are greatly reduced, we still have the problem of rolling resistance which is present at all speeds. To a first approximation, the energy lost with a given vehicle due to this form of drag is simply proportional to a product of the travel distance and the total load on the wheels. While this rolling resistance is a problem for automobiles, it is a much more serious problem for trucks where their great weight translates into large rolling resistance force due to the rubber tire friction effects.

We have as background a great amount of information about railroad wheel and track systems. Especially relevant is the braking issue, where slipping of steel wheels on steel rails is a long known concern that has generated a large amount of patent literature, largely related to ways to start trains under heavy loads. A rule heard by the present inventor long ago was that if a locomotive wheel slipped on a track, even briefly, that wheel was damaged to the point that it would have to be replaced.

There is also much background available on rubber tires and their construction. As a matter of definition, a tire here refers to any material on the perimeter of a wheel that deforms under load to conform to a road surface.

Furthermore, anti-lock brake mechanisms are also extensively developed for use where wheels are equipped with such tires.

There is also much knowledge of hydroplaning effects for tires on roads. It is relevant also for steel wheels, but the size of the contact spot being small for steel wheels on rails, pressure being thus high, the hydroplaning effect is said to be minimized.

We also have body of data on coefficient of friction between various materials, including various road surfaces relative to rubber and various metals, including steel on steel. Other choices of metals are not beyond consideration in looking for the best possible wheel arrangements. In general, steel is the most common form of rigid wheel; that being the wheel use by railroad equipment.

In existence are arrangements whereby road vehicles with rubber tires are also fitted with steel wheels to enable those road vehicles to run on railroad tracks. These are known to be used in railroad service vehicles, where apparently the rubber tires in contact with the steel rails provide the driving and braking force, while the steel wheels maintain the service vehicle in position on the steel rails as a result of a flange on the steel wheels. A mechanism is involved in lowering and raising the steel wheels according to the service needed, thus, the steel wheels can be withdrawn so as to be not involved in operation on general road surfaces.

Further background of relevance is the apparatus used to raise and lower extra wheels on trucks that carry heavy loads, particularly ready-mix concrete trucks and dump trucks. These use hydraulic means to control force on such extra wheels as well as to raise and lower them when needed.

SUMMARY OF THE INVENTION

Here disclosed is a hybrid wheel apparatus with a hybrid roadway apparatus that reduces the energy lost due to rolling resistance by as much as a factor of ten, or even more. Truck wheels are the most immediate concern, though automobile wheels are also candidates to be replaced by the hybrid wheel systems.

The hybrid wheel is a steel wheel coaxially mounted with a rubber tired wheel, each wheel enabled to rotate about an axis at different rotation rates. The hybrid roadway is a low profile steel rail fixed to the otherwise plain road surface, which is preferably concrete but could also be the very common asphalt composition.

The rail is elevated over the roadway surface and the steel wheel is of smaller diameter than the rubber tired wheel. Dimensions are set so that most of load force is carried on the steel wheel for general forward travel, but where the rail is absent the load is carried on the rubber tire. When the roadway is not fitted with a rail, contact between the steel wheel and the roadway would be avoided by the arrangement.

The steel rail fixed to the roadway would be shaped with tapering on its edges such that it would present a minimal road surface discontinuity for vehicles that would need to pass over it when traveling approximately parallel to that rail. The resulting tapered rail profile gives a rail height at the edges that is close to the same height as the roadway.

As vehicles operate to transition from driving approximately parallel to the rails to driving with the steel wheels engaged on the rails, the tapered rail profile enables a vehicle driver to comfortably make that transition.

The radius of the rubber tired wheel, unloaded, minus the radius of the steel wheel is approximately equal to the peak height of the rail surface above the roadway. Also, the difference in radii the two wheels must be sufficient that when the rail is absent and the rubber tired wheel is loaded, the steel wheel is sufficiently high to not be in contact with the roadway. The rail height can be reduced in applications in order to make that rail height acceptable to motorists, where such lowering will have the affect of placing some of the load on the rubber tired wheel. Such an adjustment will limit the efficiency of the system and so should be avoided if possible.

Where the above mentioned adjustment is made, an accompanying lesser efficiency gain will result, but an acceptable balance is attainable, which still is an important improvement.

It is common that tires are constructed to make the road contacting surface of the tire as flat as possible. Circumferential belting can be fully utilized to flatten a tire surface along a line parallel to the wheel axis and material can be added to edge corners of the tire to accomplish a similar effect. Either or both flattening methods having the effect of increasing the fraction of the load on the steel wheel without as high a rail.

Additional apparatus is appropriate in various implementations to avoid the damaging effect of slip of the steel wheel on a steel rail, especially with attention to the likelihood of occasional emergency stops.

Automatic means or manually activated means of shifting loads to the appropriate wheel that have the equivalent effect of the arrangements described are also included as variations on the present invention.

DETAILED DESCRIPTION OF THE PREFERRED EMBODIMENT AND VARIATIONS

Figure 1:
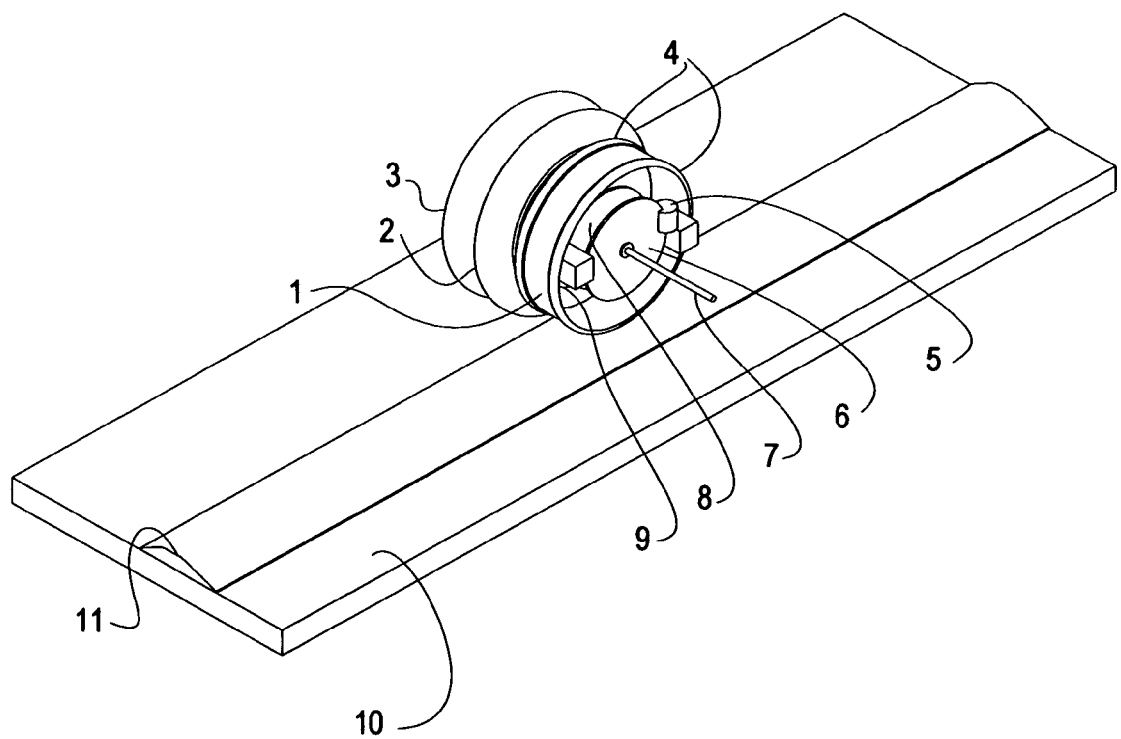
FIG. 1 Isometric view of truck type hybrid wheel system on a hybrid of a conventional road surface and a rail.

Here disclosed is a hybrid wheel apparatus with a hybrid roadway apparatus that reduces the energy lost due to rolling resistance by as much as a factor of ten, or even more. Truck wheels are the most immediate concern, though automobile wheels are also candidates to be replaced by the hybrid wheel systems.

The hybrid wheel is a steel wheel coaxially mounted with a rubber tired wheel, each wheel enabled to rotate about an axis at different rotation rates. The hybrid roadway is a low profile steel rail fixed to the otherwise plain road surface, which is preferably concrete, but could also be the very common asphalt composition.

The rail is elevated over the roadway surface and the steel wheel is of smaller diameter than the rubber tired wheel. Dimensions are set so that most of load force is carried on the steel wheel for general forward travel, but where the rail is absent the load is carried on the rubber tire. When the roadway is not fitted with a rail, contact between the steel wheel and the roadway would be avoided by the arrangement, conditional on the degree of deformation of the loaded rubber wheel.

The steel rail fixed to the roadway would be shaped with tapering on its edges such that it would present a minimal road surface discontinuity for vehicles that would need to pass over it when traveling approximately parallel to that rail. The resulting tapered rail profile gives a rail height at the edges that is close to the same height as the roadway.

As vehicles operate to transition from driving approximately parallel to the rails to driving with the steel wheels engaged on the rails, the tapered rail profile enables a vehicle driver to comfortably make that transition.

The radius of the rubber tired wheel, unloaded, minus the radius of the steel wheel is equal to the peak height of the rail surface above the roadway except that the radius difference is sufficient that when the rail is absent such that the tired wheel is loaded, the steel wheel is not in contact with the roadway. An adjustment to this rule is appropriate in order to make the rail height acceptable to motorists, this adjustment being a lowered rail such that the system acts to put some of the load on the rubber tired wheel.

Where the above mentioned adjustment is made, an accompanying lesser efficiency gain will result, but an acceptable balance is attainable, which still is an important improvement.

It is common that tires are constructed to make the road contacting surface of the tire as flat as possible. Circumferential belting can be fully utilized to flatten a tire surface along a line parallel to the wheel axis and material can be added to edge corners of the tire to accomplish a similar effect. Either or both flattening methods having the effect of increasing the fraction of the load on the steel wheel without as high a rail.

Additional apparatus is appropriate in various implementations to avoid the damaging effect of slip of the steel wheel on a steel rail, especially with attention to the likelihood of occasional emergency stops.

Automatic means or manually activated means of shifting loads to the appropriate wheel that have the equivalent effect of the arrangements described are also included as variations on the present invention.

Provision for unintended contact with the conventional road surface includes cushioning bands on the steel wheel. A crown on the rail making the rail higher at center than it is nearer to the edges would enable the protective cushioning bands from having significant rail contact.

Material having properties of low rolling resistance can replace steel. Materials suitable for rolling on roadways can replace rubber in tires or even the tires themselves.

Steel wheels on steel rails offer control system opportunity as well as alarm signal creation for developing situations where there is loss of contact between the steel wheels and rails. For control purposes an additional sensing means is needed to provide polarity to error information.

Because the diameters of coaxially mounted wheels differ, the rotation rate, or the angular velocity will differ. Freedom to turn separately would preferably be enabled. However, for coaxial wheels having a common drive axle, a differential action is required, which must also be a limited slip type of differential. For simpler hybrid wheels that only act for weight carrying purposes, the rubber wheels and the steel wheel turn as necessary to roll over the road and rail respectively. This simple hybrid wheel is fitted with a braking apparatus, and though a common rotating braking surface is precluded by need for different rotation rates, a caliper and pad arrangement is configured to apply force of brake pads that are in contact with respective separate rotating braking disc surfaces.

FIG. 1 is an isometric view of truck type hybrid wheel system on a hybrid of a conventional road surface and a rail. An opposite wheel would be present though it is not shown. The steel wheel 1 is formed like the end part of a steel barrel where the flat end and a short part of the barrel side are retained. This is not unlike wheels on which tires are mounted. However, the only rubber on these is a set of rings 4 that are seated in grooves on the steel wheel, where these rubber rings are reinforced such that they are rigidly fixed in the steel wheel grooves. Technology is used that is not unlike that of tire technology, where tires are constrained by the lip on conventional tire rims.

Notice should be taken that hubs on axles rotate with benefit of bearing systems as appropriate for the weight and dynamic loading requirements. Such are not shown in the schematic level illustrations disclosed here.

FIG. 1 also shows the conventional two rubber tires that are typical on large trucks. The outer of these 3 and the inner of these 2 are conventionally mounted on rims that are held fixed to each other. Separate brake calipers 5,9 serve to activate brake pads on brake outer disc 5 and inner disc 8. An outer disc 8 is mounted on a first hub that is carried through as the hub for the wheels on which the tires 2,3 are mounted. An inner disc 8 is rigidly mounted on a second hub that uses that first hub as an axle and connects rigidly to the steel wheel 1. The first hub turns on a fixed axle 7 that acts as a common axle for the coaxially mounted wheels.

FIG. 1 also shows the conventional road surface 10 with flattened steel rail 11 attached thereto. Road surface 10 is only shown for the half that would be under approximately the center line of the truck. Flattened steel rail 11 is tapered with a fairly wide crown at the top. The opposite side rail is not shown. The tapering enables rubber tired vehicles, including those of the present hybrid, to cross over without serious jolting effects. More explanation of this arrangement is in FIG. 2.

Figure 2:
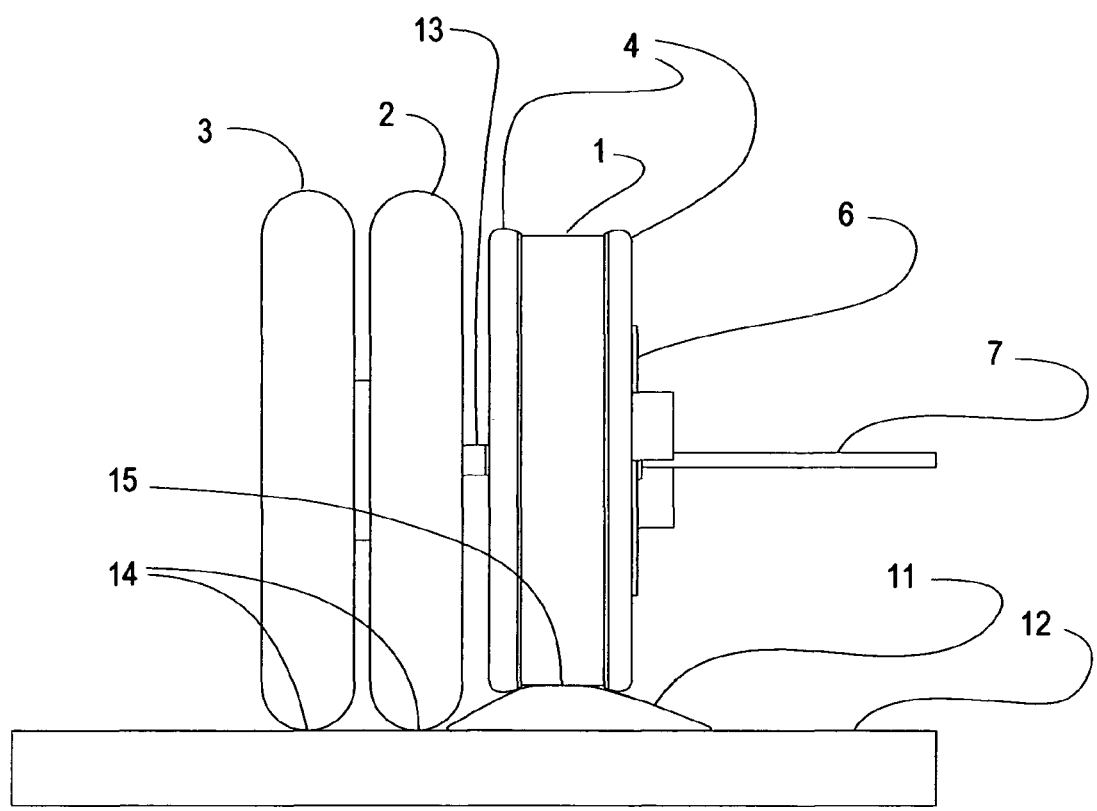
FIG. 2 End view of hybrid wheel and rail showing minimal rubber tire contact with road, with main load being on steel wheel.

FIG. 2 is an end view of hybrid wheel and rail showing rubber tires 2,3 unloaded, with main load being on steel wheel 1. FIG. 2 enables view of the previously mentioned first hub 13 that turns on fixed axle 7 and is attached through conventional tire rims to tires 2,3. With the steel rail 11 in supporting contact 15 with the cylindrical steel wheel 1 the rubber tires are unloaded so they have minimal contact 14 with the conventional road surface 10.

Figure 3:
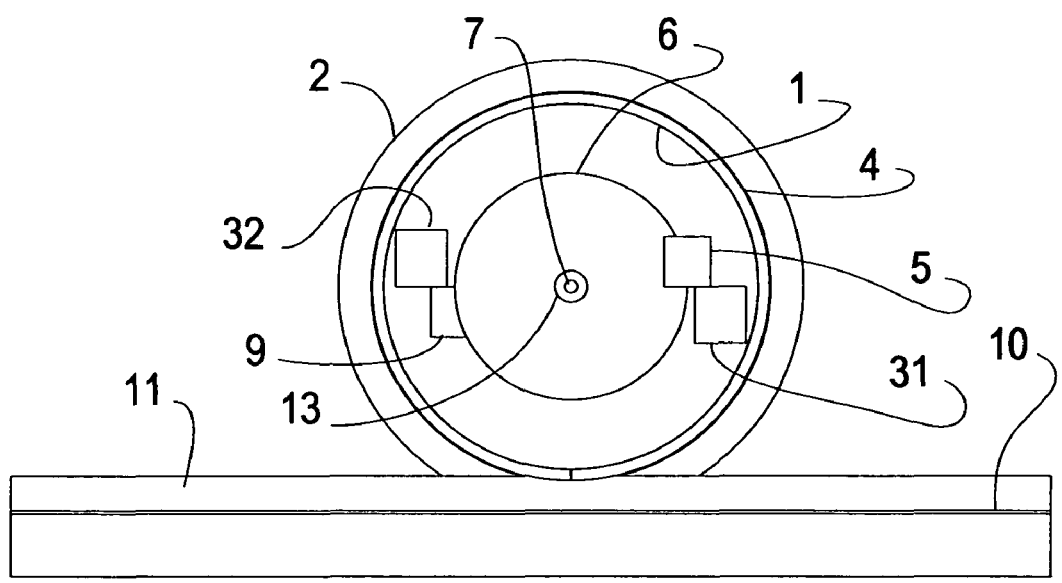
FIG. 3 Side view showing truck type wheel system.

FIG. 3 is a side view showing the same truck type wheel system. But this view allows visibility of mounting blocks 31,32 for the brake calipers 5,9.

Figure 4:
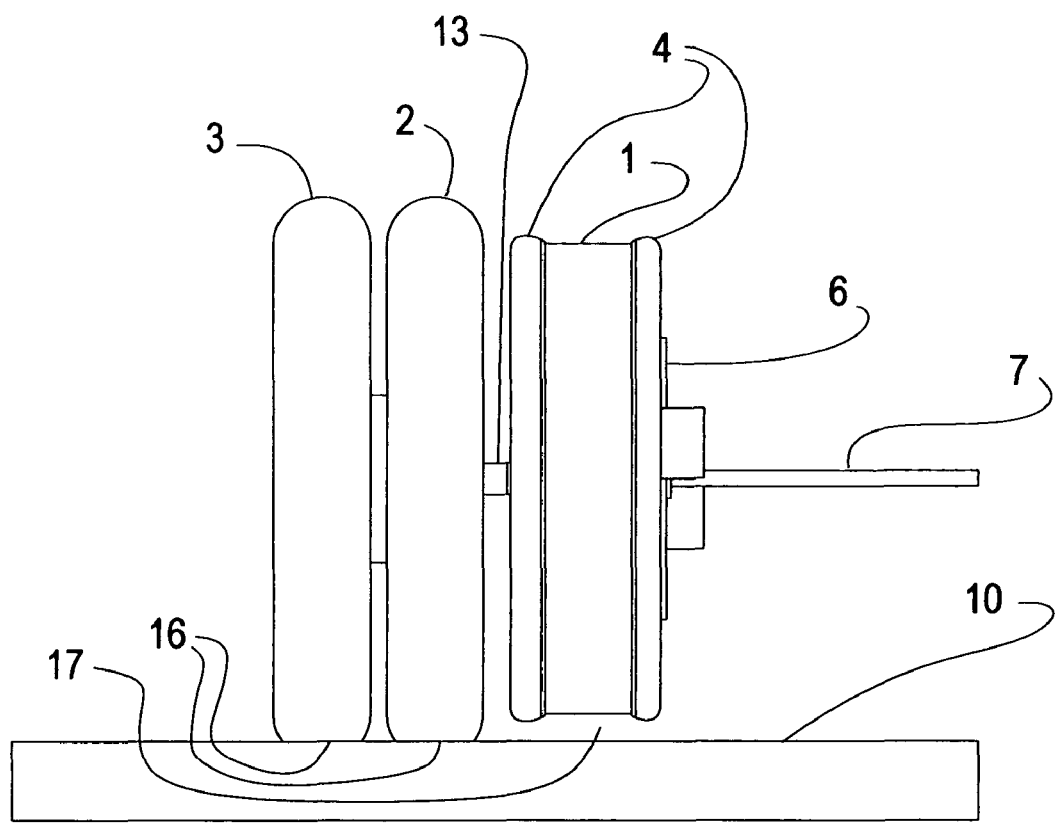
FIG. 4 End view showing effect of load shift to rubber wheels when rail is not present.

FIG. 4 an end view showing effect of load shift to rubber wheels when rail is not present. Flattened tire effects 16 are shown as indications that load is now on rubber tires. Clearance 17 is shown that serves to prevent contact of the steel wheel 1 with the conventional road surface 10, even when tires are significantly loaded. This condition is similar to when the rail is lowered, either partially or fully such that the rail top is even with the road surface, to facilitate crossing of the rail by the topic vehicle as well as other vehicles. Although the system is designed to enable such crossings in general, it could be popularizing to make the crossover less annoying where it would occur frequently.

Figure 5:
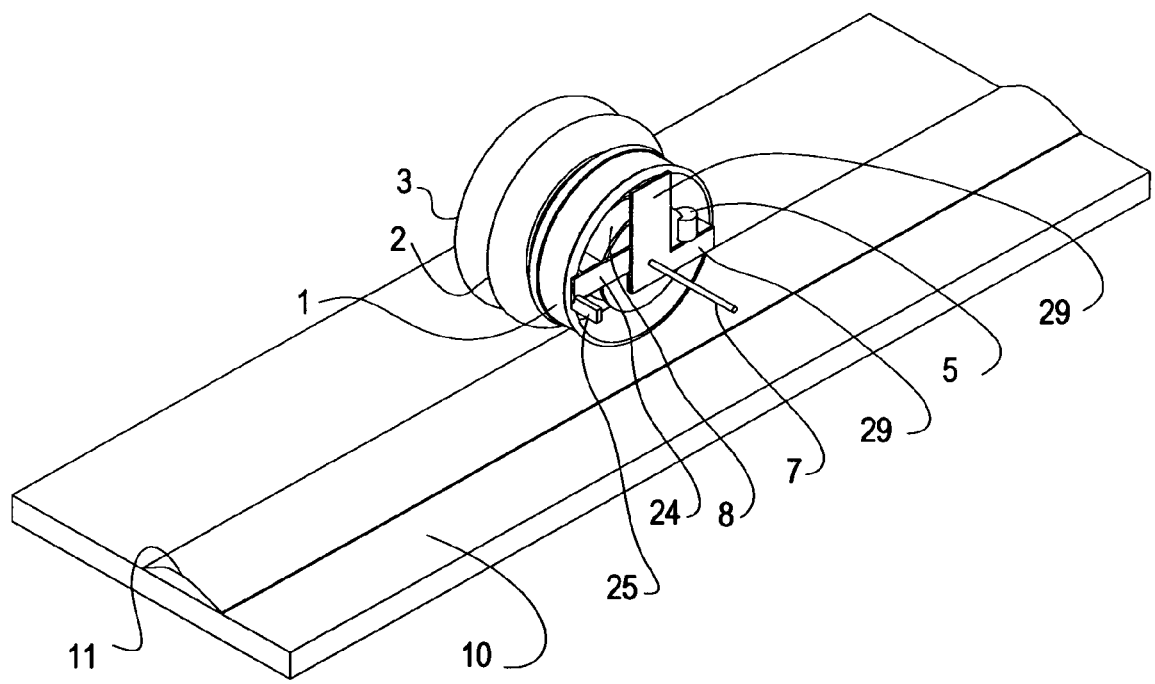
FIG. 5 Isometric view showing brake calipers connected to mount that pivots about axle, enabling separate brake action and anti-lock braking for steel wheel.

FIG. 5 is an isometric view showing brake caliper mounting block carriers 29,24 that pivot about the axle 7, enabling separate brake action for the two wheel types and anti-lock braking for the steel wheel 1. The forward brake caliper 5 works with carrier 29 to brake through the rubber tired wheels 2,3 . The rear caliper works with the other carrier 24 to brake through the steel wheel 1.

Figure 6:
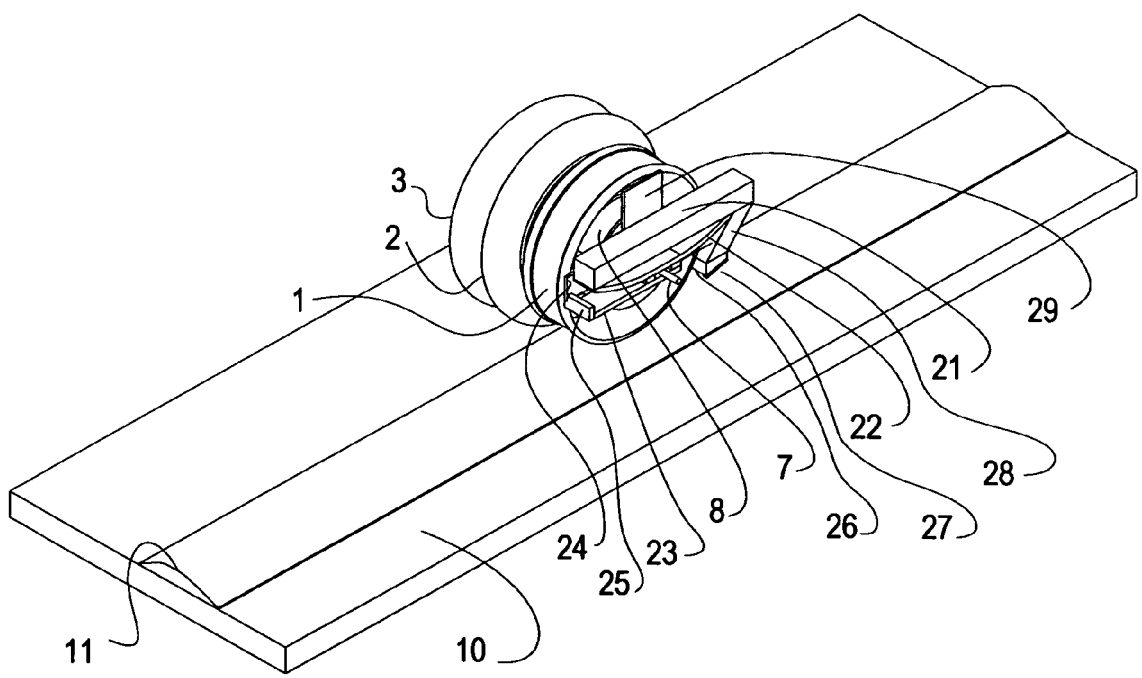
FIG. 6 Anti-lock brake implementation to prevent slippage of steel wheel on steel rail, with external brake provision.

FIG. 6 shows the anti-lock braking implementation for the steel wheel 1, with external brake provisions. Rear caliper carrier 24 ties through a connecting block 25 to connecting arm 23 that transfers torque about axis of axle 7 to spring 22 and then to a support beam 21 and then to an angled arm 28. The angled arm 28 is configured to hold brake pad 26 and guard strips, one such guard strip 27 being visible. The guard strips serve as protection for the brake pad 26 unless the rail 11 is present. Where that rail 11 is present, the crown of that rail allows contact with the brake pad 26. The brake pad is mounted using technology known in brake pad construction that is well known in the truck and automotive industries.

Figure 7:
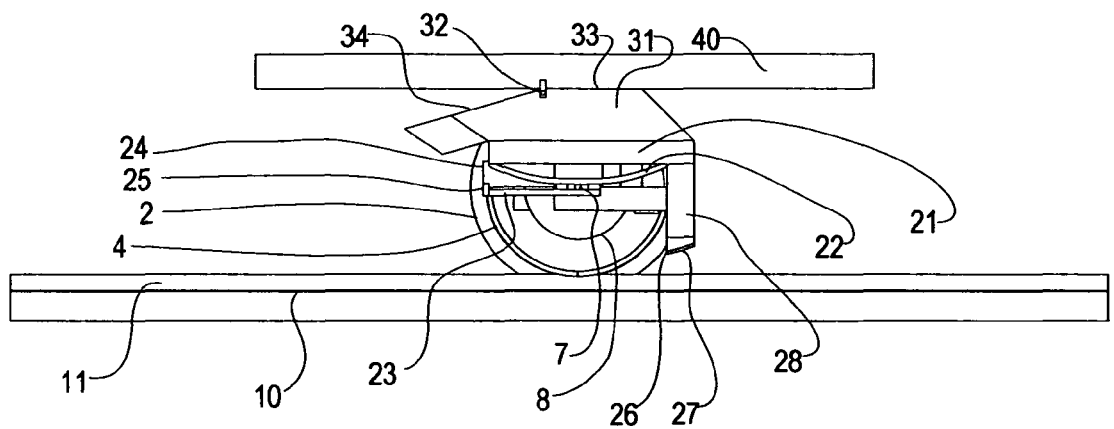
FIG. 7 Side profile view showing anti-lock braking.

FIG. 7 is a side profile view showing additional parts and more detail of the anti-lock braking arrangement. Support beam 21 is attached to a shaped support structure 31 that rests against a truck understructure beam 40 for normal operation. The shaped support structure 31 hinges on a pin 32 that enables that shaped support structure 31 to rock backward such that and until an upper surface 31 is stopped against the truck understructure support beam 40. As a result of the rocking action the brake pad 26 is forced against the rail 11.

Figure 8:
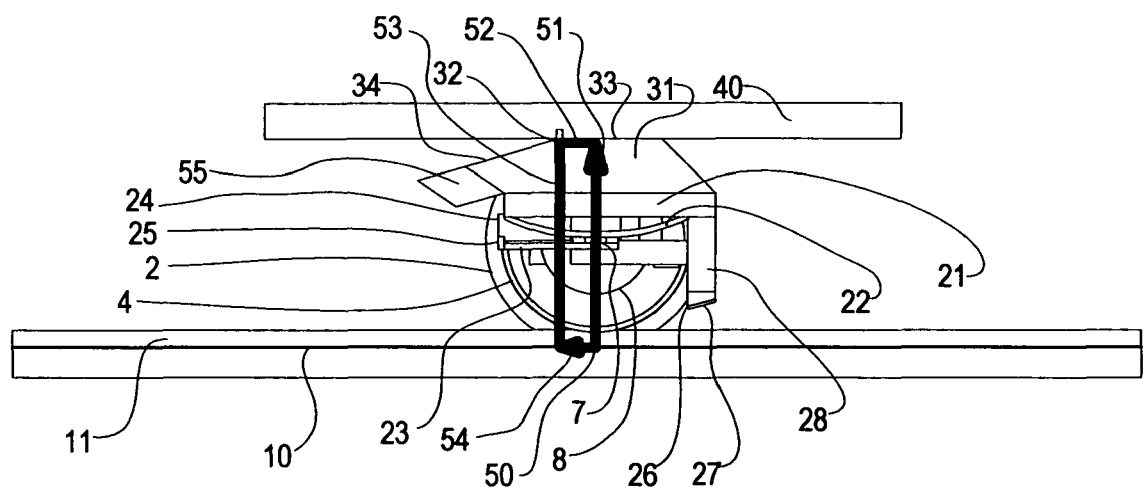
FIG. 8 Side profile view showing anti-lock braking with explanatory vectors showing action control relative to load on wheel.

FIG. 8 is the same profile view showing anti-lock braking with explanatory vectors showing how variable slippage force limitation is determined by load on wheel. A vertical vector 51 indicates force due to overall load of truck on the particular wheel 1 of concern which is vertical component of the force acting at steel on steel contact point 50. A horizontal vector 54 indicates braking force acting horizontally at that contact point 50. Considering moments about the hinge pin 32 the lever arms indicated by lengths of lines 52, 53 apply to respective forces 51,54. Ignoring weight of the wheel, the support structure 31 rocking action will occur when the product of the horizontal force 54 and vertical lever arm 53 exceeds the product of vertical force 51 and horizontal lever arm 52. By appropriately setting the horizontal offset of the hinge point 32 in relation to the steel on steel contact point 50 the maximum horizontal braking force 54 can be set such that it will not exceed the force at which slippage would occur. Because this force at which slippage would occur is equal to the product of the weight at the contact point 51 and the coefficient of starting friction, the appropriate pin 32 setting can be pre-determined and fixed in the design. Provisions for operational adjustment are possible. For the appropriate setting, the rocking action of the supporting structure 31 will result in contact of the brake pad 26 with the rail 11 well before slippage can occur between steel parts.

An issue could be an inadvertent rocking action if the steel wheel inadvertently was lifted up through some unexpected circumstance. This could result in the wheel coming down in a rocked condition such that the anti-lock braking system would be active, and possibly would lock up in that condition. Thus it would be appropriate to balance the wheel weight about the hinge pin 32 with a counter weight 55 attached to rearward to maximize its lever arm, thus balance that wheel system with the least possible additional weight.

It should be particularly noted that this implementation of an anti-lock brake is representative of an anti-lock brake system, of which there are many. It seems likely that more sophisticated system are available or would become available. Railroad locomotive wheels are controlled very carefully to avoid slippage and knowledge from this field would be applicable in refining the braking system here disclosed.

Figure 9:
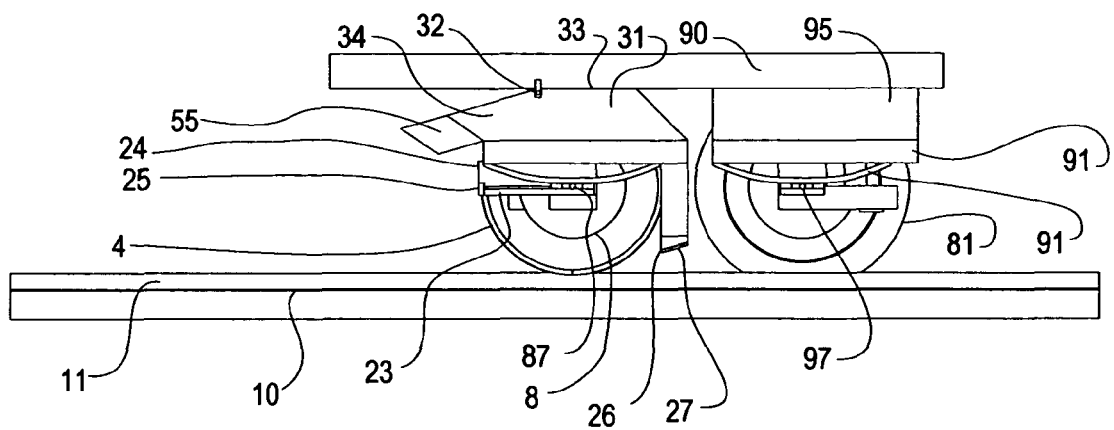
FIG. 9 Side view of steel wheel and tire wheels on separated axes, enabling independent drive appropriate for powered wheel set.

FIG. 9 depicts a side view of the steel wheel and tire wheels on separated axes 87,97, enabling independent drive appropriate for powered wheel set. This complexity over the coaxially mounted wheels of the prior figures would not be necessary if the rubber wheels were rarely in contact with the road surface while the steel wheel was engaged on the rail. However, there is a concern that for operation where the rubber wheels had contact while the steel wheel had contact with the rail, whether due to an intention for partial loading of the rubber wheels, or simply concern over transitional effects, the fact that the wheels being of different radius will force rotation rates to be different, or slippage of some kind will occur. Thus, it seems appropriate to provide for a hybrid wheel configuration that enable separate drive rotation rates. The separated axels 87,97 make this possible, and of course, these are now driven axles rather than fixed as the previous axle 7 was described. The parts correspond closely with those of the previous figures. The rubber tired wheels 81 are now offset from the steel wheel. We now have a second spring 91, a different attachment structure 91 and a fixed structure 95 mounted on a different truck understructure 90.

Figure 10:
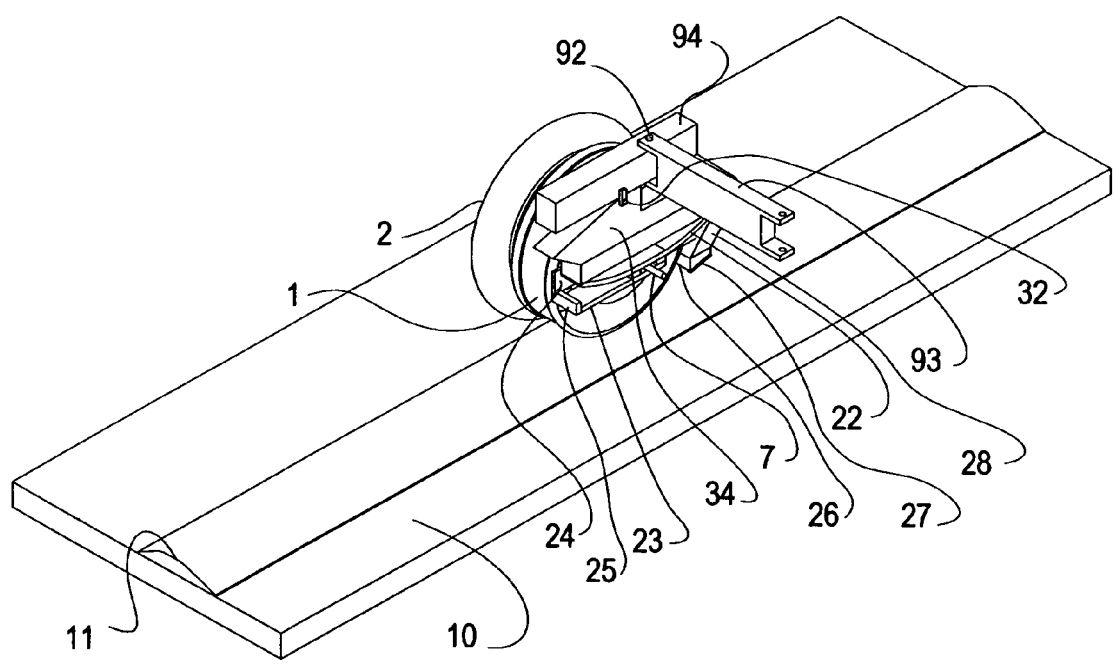
FIG. 10 Front truck wheel concept where single wheel with tire is used with a steel wheel in hybrid combination and mechanism for steering is indicated.

FIG. 10 shows an example front truck wheel concept where a single wheel with tire is used with a steel wheel in hybrid combination and a mechanism for steering is included. Except for the fact that now only one wheel is desired, all the parts that hinge on the pin 32 are the same, including the anti-lock braking system. We now have king pin style pivot 92 that enables the now different support beam 94 to pivot relative to the cross beam 93 that is fixed to the structure, typically at the front of the truck. In this application the width of the steel wheel 1 could be wider to make contact with the steel rail 11 effective through more of the turning operation, especially where sharper turn could be needed.

Figure 11:
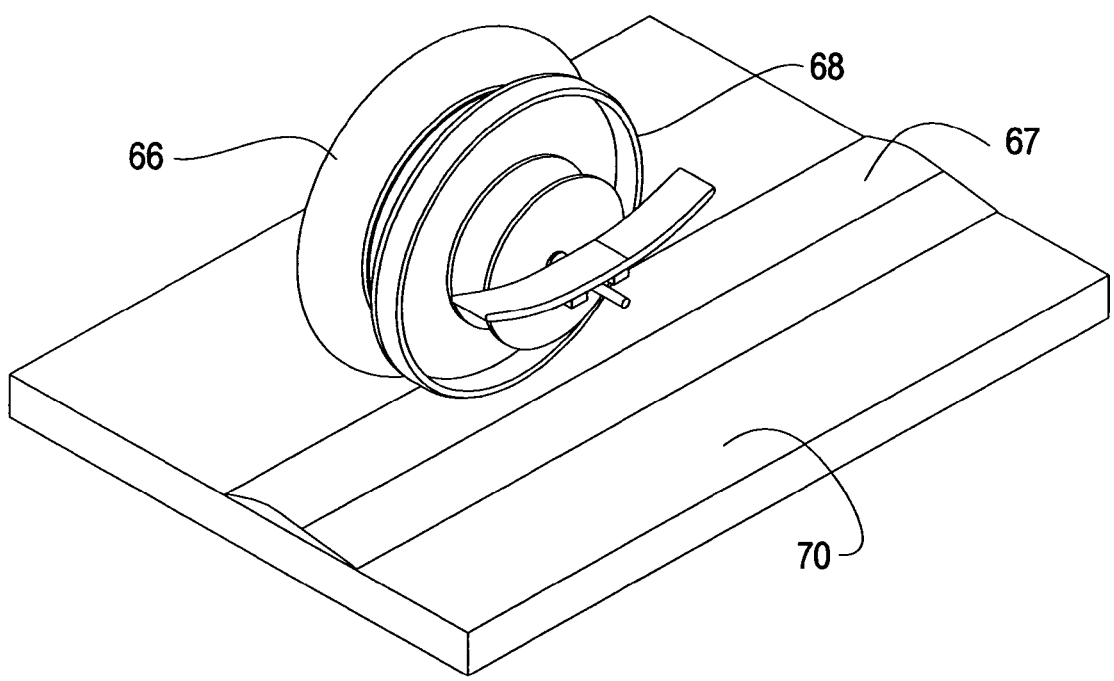
FIG. 11 Automobile application where narrower steel wheel is used with a lower rail, in isometric view.

FIG. 11 is an isometric view illustrating an automobile application where narrower steel wheel 68 is used with a lower rail 67. A lighter duty rubber tire 66 would be appropriate. The lower rail 67 would be installed with its opposite side counterpart in the faster lanes of a freeway. This road surface 70 would be different only to the degree that might be appropriate for cars versus trucks.

Figure 12:
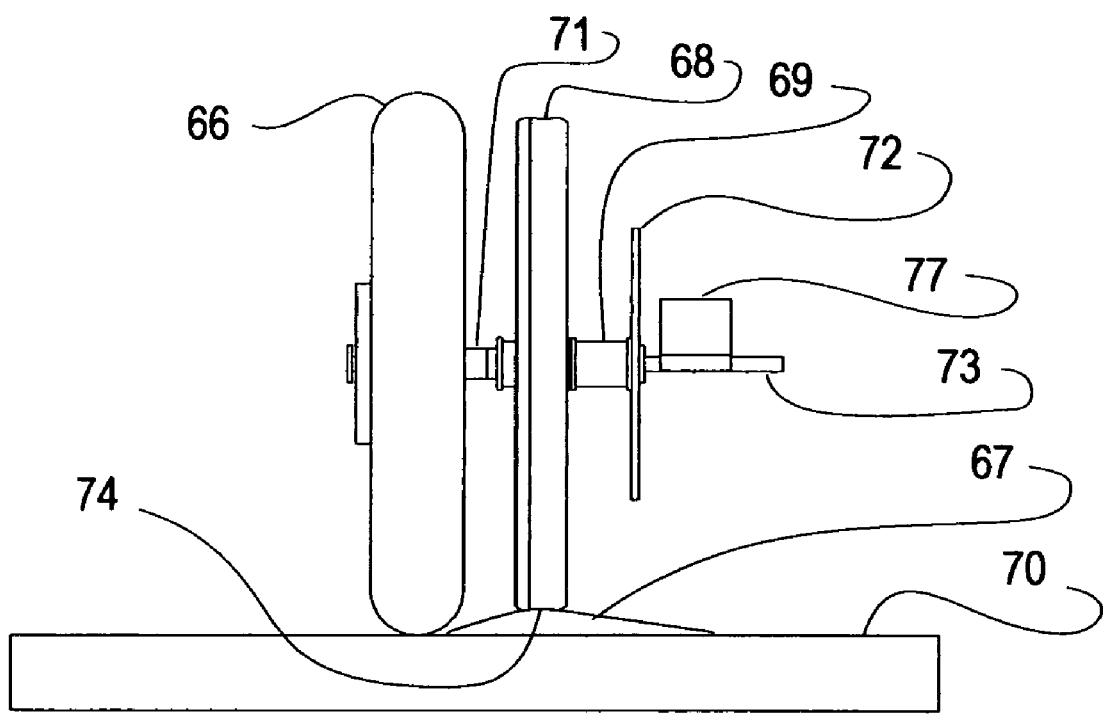
FIG. 12 Automobile application where narrower steel wheel is shown carrying load of automobile with tire carrying very light load.

FIG. 12 is a rear profile view of that same automobile application where narrower steel wheel 68 is shown carrying most of the load of the automobile with the tire 66 carrying a very light load on the road surface 70. The lower profile of the rail 67, and possibly smaller radius of both wheels could make double disc brakes unnecessary, thus only a single disc 72 is shown and previously independent hubs 69,71 are now locked together to function as one hub on the axle 73 which would be fixed. Hubs 69, 71 could also be separately functioning as before and another disc brake would be appropriate. Such independent functioning hubs would be needed if the anti-lock brake shown earlier was utilized. A representative spring 77 is shown for picturing a mounting of the axle 73 in a manner similar to previous illustrations. The load on the tire would need to be truly almost zero to not cause a bad tire wear problem. The contact region 74 between the steel wheel and the rail would be optionally shaped so that the rail crown would fit in a slight groove in the steel wheel which could serve as a driving aid. Note that steel can be replaced with another rigid material for either the rigid rail or the rigid wheel.

Figure 13:
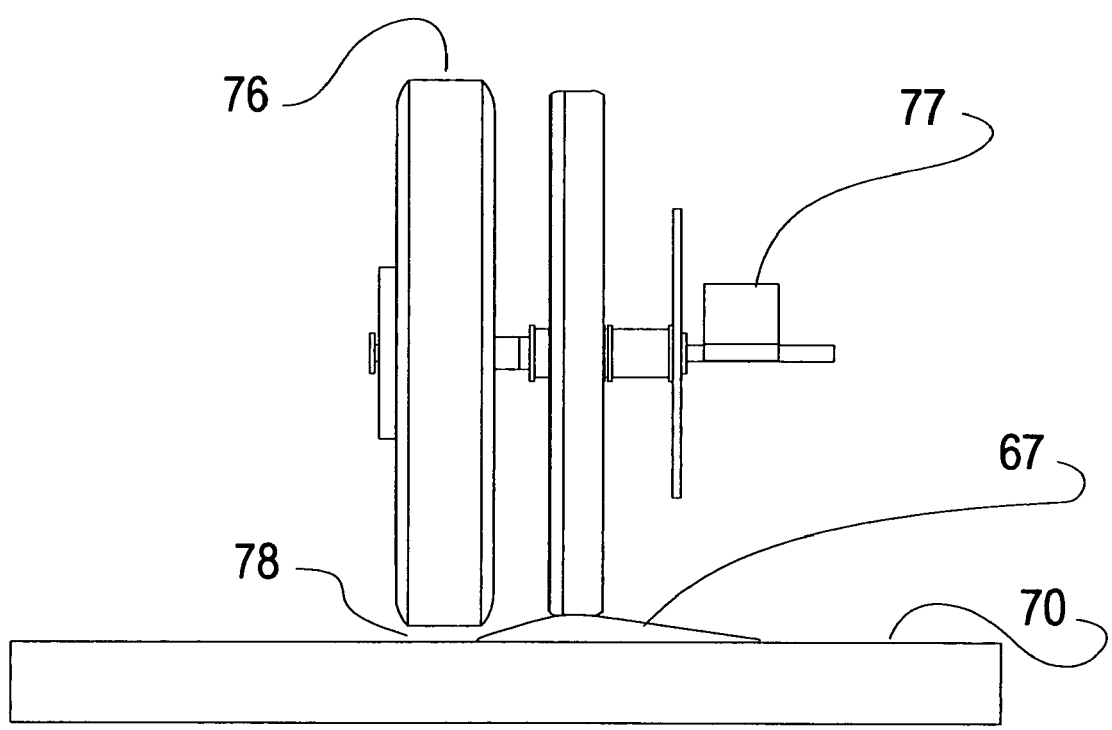
FIG. 13 Tire flattening to increase clearance with general road surface while steel wheel is carrying load, alternatively or jointly, this measure enabling a lower rail height.

FIG. 13 shows tire flattening 76 to increase clearance 78 with general road surface while steel wheel is carrying load, alternatively or jointly, this measure enabling a lower rail height. This is a continuation of current standard practice in tire construction, but the motivation of this system adds incentive to go further with use of circumferential belts as well as use of thickened tire material at the edges of the tread, such incentives including the possible simplifying objectives discussed relative to FIG. 12.

A simplification embodiment is possible where a single rail is involved and a rigid wheel on the vehicle centerline is used to carry a substantial part of the load. Operation is the same as with wheels that are arranged symmetrically about the longitudinal vehicle axis. This is an especially economical variation, both for the owner of the vehicle and the public cost of installing rails. Though it would seem to be setting up a situation that was undesirably precarious for trucks, the balancing of loads might be possible. It would also be prudent to include measures that enable operator control of the load on the rigid center line wheel or wheels. Thus, reversion to conventional truck operation by lifting could be an immediate option.

This invention is oriented toward conventional truck tires as they now are constructed and inflated, whereby they meet the condition of limited deformation of these compliant wheels. Increased pressure is a potential means of limiting this deformation. It is also assumed that roadways are reasonable surfaces and that drivers are diligent in watching for conditions that could damage the steel wheels. Protection is provided by the firm rubber rings on the steel wheel edges but this has capability to protect the wheel against only limited hazards.

The described embodiment and variations are examples of the invented concept that are not limitations thereto. The attached claims are intended to be the legal description of the invention.

I claim:

1. A vehicle with a hybrid wheel system adapted to operate in combination with a hybrid roadway system to create an efficient and flexible transportation system where said hybrid wheel system includes a compliant wheel that significantly deforms under load and conforms to road surfaces, and a rigid wheel that deforms very little under load, where said hybrid roadway system includes conventional roads and a paved road having a generally planar, paved surface, and a railed road of at least one rail that is a rigid strip attached to said paved road, where said rail is formed to provide a narrow, rigid surface at a prescribed height above said paved road, with a tapered height transition shape that begins at each edge of said rail at a height close to said paved road and blends smoothly to said prescribed height to form a crown on said rail that runs parallel to vehicle travel direction, where a total of radius of said rigid wheel and said prescribed height is approximately equal to functional radius of said compliant wheel that is measured vertically from axis of said compliant wheel to said paved road, where said vehicle is adapted to enable approximately conventional operation on chosen said conventional roads such that said compliant wheel is utilized for load carrying purposes, and said rigid wheel is held above surfaces of said conventional roads at a height that avoids contact between said rigid wheel and said conventional roads, where said vehicle is adapted to enable operation on said railed road, including that said vehicle is equipped with steering apparatus that enables engaging of a rigid wheel on a rail such that said rigid wheel is utilized for load carrying purposes, and said compliant wheel is held at a height to minimize contact force on said paved road.

2. A vehicle according to claim 1 that includes two parallel rails where said steering apparatus enables two opposite rigid wheels to engage respective parallel rails.

3. A vehicle according to claim 1 where said compliant wheel and said rigid wheel are coaxially mounted on a common axis.

4. A vehicle according to claim 1 where said compliant wheel and said rigid wheel are coaxially mounted on horizontally offset axes.

5. A vehicle according to claim 1 where said rigid wheel is fitted with rings of slightly compliant material, where a ring serves to protect said rigid wheel from damage from inadvertent contact with surfaces that are not rigid rail surfaces.

6. A vehicle according to claim 1 where said rigid wheel is fitted with rings of material, where a ring serves to assist in steering operation to maintain proper positioning of said rigid wheel on said rail.

7. A vehicle according to claim 1 where said wheel system includes an anti-lock braking system to avoid slippage of said rigid wheel on said rail.

8. A vehicle according to claim 1 where said wheel system includes means to limit horizontal braking force of said rigid wheel on said rail approximately in proportion to downward force of said rigid wheel on said rail.

9. A vehicle according to claim 1 where said wheel system includes means to limit horizontal braking force of said rigid wheel on said rail approximately in proportion to downward force of said rigid wheel on said rail, where said means to limit horizontal braking force activates motion that causes a brake pad to engage said rail.

10. A vehicle according to claim 1 where said rigid wheel includes a circumferential indentation that assists in guiding said rigid wheel along said rail.

11. A vehicle according to claim 1 where said rigid wheel is formed of steel.

12. A vehicle according to claim 1 that is equipped with a sensor that detects contact between said rigid wheel and said rigid rail.

13. A vehicle according to claim 1 and a sensor that alerts operator that a rail transition is imminent.

14. A vehicle according to claim 1 where a said compliant wheel is a tire.

15. A vehicle according to claim 1 where a said compliant wheel is a tire that is additionally flattened compared to a conventional tire by use of a circumferential belt of tire reinforcement material.

16. A vehicle according to claim 1 where a said compliant wheel is a tire that is additionally flattened compared to a conventional tire by use of material thickening at tread edge of said tire.

17. A vehicle according to claim 1 where said rigid wheel is approximately on a centerline of said vehicle and a single said rigid rail is attached to said road surface.

18. A vehicle according to claim 1 where said rigid wheel is approximately on a centerline of said vehicle and a single said rigid rail is attached to said road surface.

19. A vehicle according to claim 1 where wheels are arranged in pairs, with wheels in correspondence on opposite sides of said vehicle.

20. A vehicle according to claim 1 that is a truck for hauling cargo.

21. A vehicle according to claim 1 that is a passenger vehicle.

22. A vehicle according to claim 1 including a mechanism to lower said rigid wheel to cause it to carry load.

23. A hybrid roadway system that is adapted to enable operation of a vehicle equipped with a hybrid wheel system in combination with said hybrid roadway system to enable an efficient and flexible transportation system, where said hybrid wheel system includes a compliant wheel that significantly deforms under load and conforms to road surfaces, and a rigid wheel that deforms very little under load, where said hybrid roadway system includes conventional roads and a paved road having a generally planar, paved surface, and a railed road of at least one rail that is a rigid strip attached to said paved road, where said rail is formed to provide a narrow, rigid surface at a prescribed height above said paved road, with a tapered height transition shape that begins at each edge of said rail at a height close to said paved road and blends smoothly to said prescribed height to form a crown on said rail that runs parallel to vehicle travel direction, where a total of radius of said rigid wheel and said prescribed height is approximately equal to functional radius of said compliant wheel that is measured vertically from axis of said compliant wheel to said paved road, where said vehicle is adapted to enable approximately conventional operation on chosen said conventional roads such that said compliant wheel is utilized for load carrying purposes, and said rigid wheel is held above surfaces of said conventional roads at a height that avoids contact between said rigid wheel and said conventional roads, where said vehicle is adapted to enable operation on said railed road, including that said vehicle is equipped with steering apparatus that enables engaging of said rigid wheel on said rigid rail such that said rigid wheel is utilized for load carrying purposes, and said compliant wheel is held at a height to minimize contact force on said paved road.

24. A hybrid roadway system according to claim 23 where said rail is tapered to enable vehicles operating on compliant wheels to cross without excessive impact.

25. A hybrid roadway system according to claim 23 where rails intersect at an approximately right angle, where intersecting rails are tapered slowly in direction of travel of vehicles such that respective prescribed heights are reduced to approximately zero to enable smooth vehicle operation over intersecting paths.

26. A hybrid roadway system according to claim 23 where said rail is height reduced such to facilitate crossing by vehicles, such that both said rigid wheel and said compliant wheel carry significant load.

27. A hybrid roadway system according to claim 23 where said rail is formed of steel.

28. A hybrid roadway system according to claim 23 where a base of said rail is embedded in said paved road.

29. A hybrid roadway system according to claim 23 where said rail is embedded in said paved road and attached to reinforcing material of material that forms said paved road.

30. A transportation system that enables efficient and flexible operation of vehicles that includes a hybrid wheel system adapted to operate in combination with a hybrid roadway system,
   where said hybrid wheel system includes a compliant wheel that significantly deforms under load and conforms to road surfaces, and a rigid wheel that deforms very little under load,
   where said hybrid roadway system includes conventional roads and a paved road having a generally planar, paved surface, and a railed road of at least one rail that is a rigid strip attached to said paved road, where said rail is formed to provide a narrow, rigid surface at a prescribed height above said paved road, with a tapered height transition shape that begins at each edge of said rail at a height close to said paved road and blends smoothly to said prescribed height to form a crown on said rail that runs parallel to vehicle travel direction,
   where a total of radius of said rigid wheel and said prescribed height is approximately equal to functional radius of said compliant wheel that is measured vertically from axis of said compliant wheel to said paved road,
   where said vehicle is adapted to enable approximately conventional operation on chosen said conventional roads such that said compliant wheel is utilized for load carrying purposes, and said rigid wheel is held above surfaces of said conventional roads at a height that avoids contact between said rigid wheel and said conventional roads, and
   where said vehicle is adapted to enable operation on said railed road, where such operation is enabled by inclusion of steering apparatus that enables engaging of said rigid wheel on said rigid rail such that said rigid wheel is utilized for load carrying purposes, and said compliant wheel is held at a height to minimize contact force on said paved road.

31. A transportation system according to claim 30 where said rigid wheel operating on said rigid rail results in rolling resistance coefficient comparable to that of a conventional railroad wheel.

32. A transportation system according to claim 30 where said compliant wheel operating on a conventional enables flexibility in vehicle operation routes that is approximately the same as flexibility in vehicle operation routes that is now characteristic of motor vehicles.

* * * * *